(12) United States Patent
Pagani (10) Patent No.: US 9,835,515 B2
(45) Date of Patent: Dec. 5, 2017

(54) PRESSURE SENSOR WITH TESTING DEVICE AND RELATED METHODS

(71) Applicant: STMICROELECTRONICS S.r.l., Agrate Brianza (IT)

(72) Inventor: Alberto Pagani, Nova Milanese (IT)

(73) Assignee: STMicroeletronics S.r.l., Agrate Brianza (MB) (IT)

( * ) Notice: Subject to any disclaimer, the term of this patent is extended or adjusted under 35 U.S.C. 154(b) by 255 days.

(21) Appl. No.: 14/511,346

(22) Filed: Oct. 10, 2014

(65) Prior Publication Data

US 2016/0103035 A1 Apr. 14, 2016

(51) Int. Cl.
| | |
|---|---|
| G01L 25/00 | (2006.01) |
| G01L 1/16 | (2006.01) |
| G01L 1/22 | (2006.01) |
| G01L 1/26 | (2006.01) |

(52) U.S. Cl.
CPC ............. *G01L 25/00* (2013.01); *G01L 1/16* (2013.01); *G01L 1/2206* (2013.01); *G01L 1/26* (2013.01)

(58) Field of Classification Search
CPC . G01L 1/16; G01L 1/2206; G01L 1/26; G01L 25/00
See application file for complete search history.

(56) References Cited

U.S. PATENT DOCUMENTS

| | | | |
|---|---|---|---|
| 4,708,012 A | 11/1987 | Folk et al. | |
| 4,756,193 A | 7/1988 | Luettgen | |
| 5,094,973 A | 3/1992 | Pang | |
| 6,688,156 B2 | 2/2004 | Dietrich et al. | |
| 6,950,767 B2 | 9/2005 | Yamashita et al. | |
| 8,378,346 B2 | 2/2013 | Pagani | |
| 2004/0153270 A1 | 8/2004 | Yamashita et al. | |
| 2009/0033467 A1 | 2/2009 | Finocchiaro et al. | |
| 2009/0235753 A1* | 9/2009 | Yamamoto | G01L 9/0054 73/727 |
| 2011/0094314 A1* | 4/2011 | Dekker | G01L 9/0042 73/862.045 |
| 2013/0342186 A1 | 12/2013 | Pagani | |
| 2016/0172311 A1 | 6/2016 | Pagani et al. | |
| 2016/0223444 A1 | 8/2016 | Pagani et al. | |

FOREIGN PATENT DOCUMENTS

| | | |
|---|---|---|
| CN | 1479862 A | 3/2004 |
| CN | 1813178 A | 8/2006 |
| CN | 101720426 A | 6/2010 |
| GB | 1223810 | 3/1971 |
| JP | 2004119616 A | 4/2004 |
| WO | 2012084295 A1 | 6/2012 |

OTHER PUBLICATIONS

Barlian et al., "Review: Semiconductor Piezoresistance for Microsystems," Proceedings of the IEEE, vol. 97, No. 3, Mar. 2009, pp. 513-552.

* cited by examiner

*Primary Examiner* — Daniel S Larkin
(74) *Attorney, Agent, or Firm* — Slater Matsil, LLP (57) ABSTRACT

A pressure sensor is for positioning within a structure. The pressure sensor may include a pressure sensor integrated circuit (IC) having a pressure sensor circuit responsive to bending, and a transceiver circuit coupled to the pressure sensor circuit. The pressure sensor may include a support body having a recess therein coupled to the pressure sensor IC so that the pressure sensor IC bends into the recess when the pressure sensor IC is subjected to external pressure.

28 Claims, 9 Drawing Sheets

PRESSURE SENSOR WITH TESTING DEVICE AND RELATED METHODS

TECHNICAL FIELD

The present disclosure relates to the field of electronic devices, and, more particularly, to pressure sensors and related methods.

BACKGROUND

In solid structures, particularly in load-bearing structures of, for example, bridges, buildings, tunnels, railways, containment walls, dams, embankments, pipelines and underground structures of metropolitan transport lines, and so on, it is important to monitor, in many points, significant parameters, like, for example, pressure, temperature and mechanical stresses. Such monitoring is carried out periodically or continuously, and is useful both at the initial stage and during the lifetime of the structure.

For this purpose, an approach in this field includes application of electronic monitoring devices based on electronic sensors, capable of providing good performance at low cost. Usually, such devices are applied onto the surface of the structures to be monitored, or inside recesses already foreseen in the structure and accessible from the outside.

Such devices are not however able to exhaustively detect the parameters within the structure to be monitored, which it may be useful to know in order to evaluate the quality of the structure, its safety, its ageing, its reaction to variable atmospheric conditions, and so on. Moreover, such devices can only be applied after the structure has been built, and not while it is being built. Therefore, they are unable to evaluate possible initial defects.

An approach to these requirements is disclosed in U.S. Pat. No. 6,950,767 to Yamashita et al., which provides an electronic monitoring device entirely contained, i.e. "buried", within the material (for example, reinforced concrete) from which the structure to be monitored is made. More specifically, the device buried in the structure is an entire system encapsulated in a single container, made up of different parts, assembled on a substrate, such as integrated circuits, sensors, antenna, capacitors, batteries, memories, control units, and yet more, made in different chips connected together through electrical connections made with metallic connections.

The system of U.S. Pat. No. 6,950,767 to Yamashita et al. also comprises sub-systems having functions correlated with the power supply, for example, rectifiers in the case in which it receives energy from the outside, through electromagnetic waves, or else its own battery for generating the power supply internally. It should be observed that a monitoring system intended to be "embedded" initially in a building material (for example, liquid concrete, which will then solidify) and to then remain "buried" in the solid structure, is subjected to critical conditions, for example, extremely high pressures, which can even be a few hundreds of atmospheres. There are also numerous other causes of wearing, over time, due, for example, to water infiltration, capable of damaging the system.

A potential drawback to systems, such as that disclosed in U.S. Pat. No. 6,950,767 to Yamashita et al., derives from the fact that they are complex systems, even though they are enclosed in a package, and can therefore be damaged when facing the operating conditions in which they work. In particular, the electrical interconnections between the various parts of the package can be vulnerable.

Moreover, the "window" is provided in the package to allow the sensor to detect the relative parameter can be a weak point for possible infiltrations of humidity. Furthermore, a crack or imperfection in the coating material can allow water to penetrate inside the package and cause short-circuits. In addition to water, other substances, such as potentially corrosive acids, can also infiltrate. In general, although designed for the mentioned use, the reliability of systems like that of U.S. Pat. No. 6,950,767 to Yamashita et al. has a limitation due to the complexity of the structure of such systems, although miniaturized.

SUMMARY

Generally speaking, a pressure sensor for positioning within a structure may comprise a pressure sensor IC comprising a pressure sensor circuit responsive to bending, and a transceiver circuit coupled to the pressure sensor circuit. The pressure sensor may include a support body having a recess therein coupled to the pressure sensor IC so that the pressure sensor IC bends into the recess when the pressure sensor IC is subjected to external pressure.

More specifically, the pressure sensor IC may include electrically conductive antenna traces coupled to the transceiver circuit for receiving radio frequency (RF) energy. For example, the recess may be trapezoidal in shape.

In some embodiments, the pressure sensor may further comprise a glass frit bonding layer between the pressure sensor IC and the support body. Also, the support body may comprise a first layer defining the recess and comprising additional electrically conductive antenna traces coupled to the transceiver circuit, and a second layer adjacent the first layer.

In other embodiments, the pressure sensor may further comprise at least one substrate adjacent the pressure sensor IC and comprising additional electrically conductive antenna traces coupled to the transceiver circuit. The at least one substrate may comprise a flexible substrate extending laterally outwardly from the pressure sensor IC. The additional electrically conductive antenna traces may surround the pressure sensor IC. The support body may comprise at least one of a ceramic material, a glass material, or a silicon material, for example.

Another aspect is directed to a testing device for at least one pressure sensor under test. The at least one pressure sensor under test is to be positioned within a structure and may comprise a pressure sensor IC comprising a pressure sensor circuit responsive to bending, and a transceiver circuit coupled to the pressure sensor circuit, and a support body having a recess therein coupled to the pressure sensor IC. The testing device may include a probe chuck configured to apply pressure to the support body of the at least one pressure sensor under test, and a wireless card configured to apply pressure to the pressure sensor IC of the at least one pressure sensor under test, and generate RF energy to activate the at least one pressure sensor under test.

The at least one pressure sensor under test may comprise a plurality of pressure sensors under test, and the testing device may further comprise a joint coupled to the wireless card and configured to position the wireless card adjacent a respective pressure sensor under test. In some embodiments, the wireless card may comprise a rigid press configured to apply the pressure to the pressure sensor IC of the at least one pressure sensor under test, electrically conductive antenna traces configured to generate the RF energy to activate the at least one pressure sensor under test, and a substrate coupled to the rigid press and carrying the electrically conductive antenna traces.

Moreover, the rigid press and the substrate may be integral. Alternatively, the rigid press and the substrate may be laterally spaced apart. In some embodiments, the rigid press may have a curved surface. The testing device may further comprise a deformable layer between the wireless card and the at least one pressure sensor.

A method is for making a pressure sensor for positioning within a structure. The method may include providing a pressure sensor IC comprising a pressure sensor circuit responsive to bending, and a transceiver circuit coupled to the pressure sensor circuit. The method may include forming a support body to have a recess therein coupled to the pressure sensor IC so that the pressure sensor IC bends into the recess when the pressure sensor IC is subjected to external pressure.

Another aspect is directed to a method of operating a testing device for at least one pressure sensor under test. The at least one pressure sensor under test may be positioned within a structure and comprising a pressure sensor IC comprising a pressure sensor circuit responsive to bending, and a transceiver circuit coupled to the pressure sensor circuit, and a support body having a recess therein coupled to the pressure sensor IC. The method may include using a probe chuck of the testing device to apply pressure to the support body of the at least one pressure sensor under test, and using a wireless card of the testing device to apply pressure to the pressure sensor IC of the at least one pressure sensor under test, and generate RF energy to activate the at least one pressure sensor under test.

DETAILED DESCRIPTION

The present disclosure will now be described more fully hereinafter with reference to the accompanying drawings, in which several embodiments of the present disclosure are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and prime notation is used to indicate similar elements in alternative embodiments.

Figure 1:
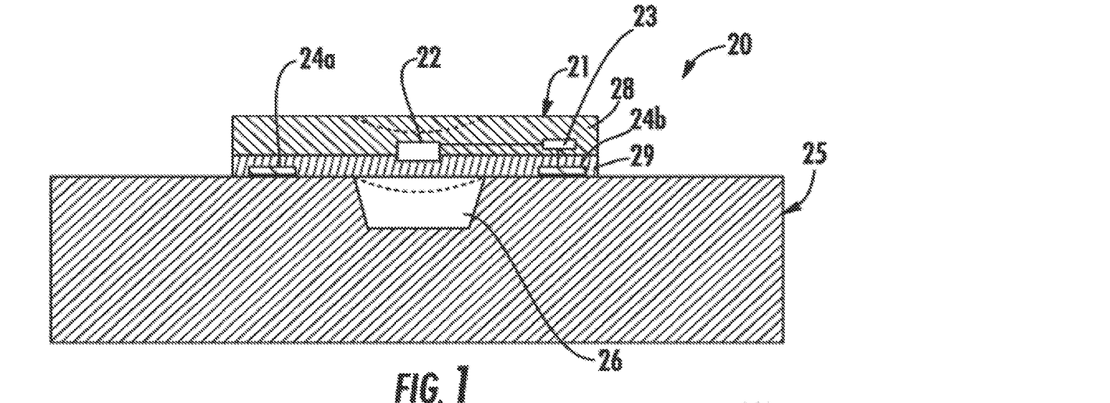
FIG. 1 is a schematic diagram of a cross-sectional view of the pressure sensor, according to the present disclosure.

Referring initially to FIG. 1, a pressure sensor 20 according to the present disclosure is now described. The pressure sensor 20 is for positioning within a structure. For example, as discussed hereinabove, the pressure sensor 20 may be embedded into concrete substructures during construction. The pressure sensor 20 illustratively includes a pressure sensor IC 21 comprising a pressure sensor circuit 22 (e.g. piezoresistive or piezoelectric pressure sensor circuitry) responsive to bending, and a transceiver or transponder circuit 23 coupled to the pressure sensor circuit (illustratively spaced apart from the pressure sensor circuit 22, but may be integrated with the pressure sensor circuit in some embodiments). The pressure sensor IC 21 illustratively includes a substrate 28 carrying the pressure sensor and transceiver circuits 22, 23, and a dielectric layer 29 on the substrate. The pressure sensor IC 21 may have a thickness of 100 microns, for example, to measure high pressure, for example, 500 atmospheres or more.

The pressure sensor 20 illustratively includes a support body 25 having a recess 26 therein coupled to the pressure sensor IC 21 so that the pressure sensor IC bends or deforms into the recess when the pressure sensor IC is subjected to external pressure. Also, the pressure sensor IC 21 illustratively includes electrically conductive antenna traces 24a-24b coupled to the transceiver circuit 23 for receiving RF energy, or more in general electromagnetic waves, and being carried by the dielectric layer 29. Advantageously, the dielectric layer 29 insulates the electrically conductive antenna traces 24a-24b and reduces electromagnetic losses that would occur if they are close/adjacent to the building material (e.g. concrete).

In the illustrated embodiment, the recess 26 is trapezoidal in shape, but other shapes are possible, such as a rectangle or circular shapes. Advantageously, the recess 26 enhances the deformation of the pressure sensor IC 21 due to the applied force by increasing the variation of the parameters of the piezoresistive or piezoelectric elements in the pressure sensor IC. The recess 26 is sealed from the external environment to protect the pressure sensor and transceiver circuits 22, 23. Also, since the sealed recess pressure is substantially less than the external pressure in the structure, the pressure sensor IC 21 will bend or bow (shown with dashed lines) into the recess 26.

The support body 25 may comprise at least one of a ceramic material, a glass material, and a silicon material, for example. In some embodiments, the support body 25 is made with material having a Young's modulus similar to silicon (or other semiconductor material). In addition, this material may be an insulator considering the presence of the electrically conductive antenna traces 24*a*-24*b* integrated in the pressure sensor IC 21. In embodiments where the support body 25 comprises silicon, the silicon may have a high resistivity, for example, it may not be doped (intrinsic semiconductor), to reduce power loss due to Eddy currents.

A method is provided for making a pressure sensor 20 for positioning within a structure. The method may include providing a pressure sensor IC 21 comprising a pressure sensor circuit 22 responsive to bending, and a transceiver circuit 23 coupled to the pressure sensor circuit. The method may include forming a support body 25 to have a recess 26 therein coupled to the pressure sensor IC 21 so that the pressure sensor IC bends into the recess when the pressure sensor IC is subjected to external pressure.

Generally, the method may include making a plurality of the pressure sensors 20 on a semiconductor wafer, testing each of the pressure sensors, and forming the recesses 26 for the pressure sensors. The formation of the recesses 26 may be performed using etching, drilling, or a laser, for example.

Figure 2:
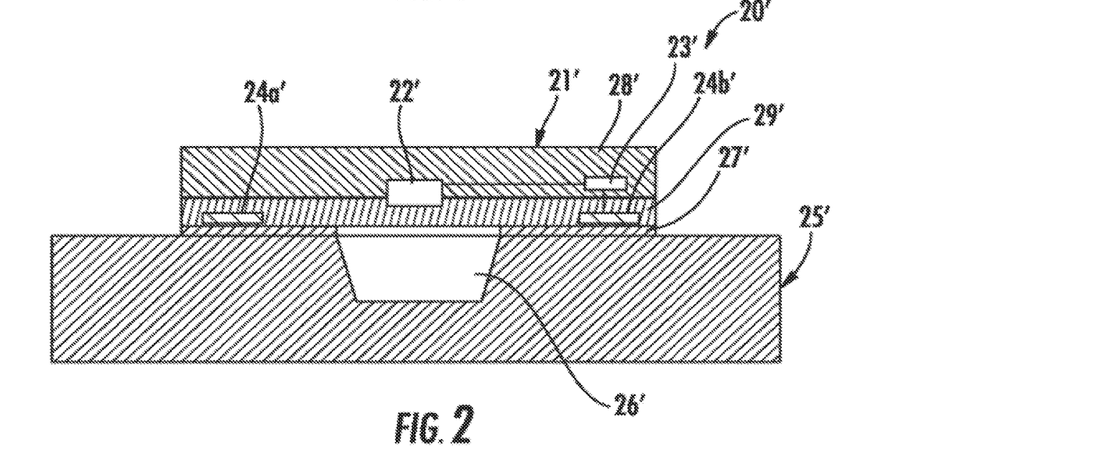
FIG. 2 is a schematic diagram of a cross-sectional view of another embodiment of the pressure sensor, according to the present disclosure.

Referring now additionally to FIG. 2, another embodiment of the pressure sensor 20' is now described. In this embodiment of the pressure sensor 20', those elements already discussed above with respect to FIG. 1 are given prime notation and most require no further discussion herein. This embodiment differs from the previous embodiment in that this pressure sensor 20' further comprises a glass frit bonding layer 27' between the pressure sensor IC 21' and the support body 25'. In this embodiment, the pressure sensor IC 21' is singulated before placement on the support body 25'. The glass frit bonding layer 27' can be replaced with an insulating layer to reduce Eddy currents and improve performance.

Figure 3:
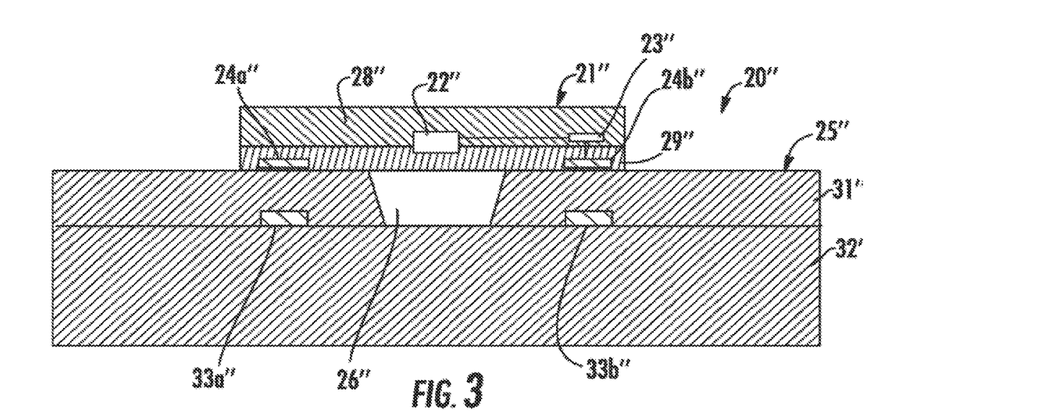
FIG. 3 is a schematic diagram of a cross-sectional view of yet another embodiment of the pressure sensor, according to the present disclosure.

Referring now additionally to FIG. 3, another embodiment of the pressure sensor 20" is now described. In this embodiment of the pressure sensor 20", those elements already discussed above with respect to FIG. 1 are given double prime notation and most require no further discussion herein. This embodiment differs from the previous embodiment in that this pressure sensor 20" illustratively includes the support body 25" comprising a first layer 31" defining the recess 26", and a second layer 32" adjacent the first layer. The first layer 31" comprises additional electrically conductive antenna traces 33*a*"-33*b*" coupled to an external system (not shown) and electromagnetically coupled to electrically conductive antenna traces 24*a*"-24*b*". An example of the external system is disclosed in United States Patent Application Publication No. 2013/0342186 to Pagani et al., assigned to the present application's assignee, the contents of which are hereby incorporated by reference in their entirety. The multilayer support body 25" may comprise a ceramic material, for example, since it includes the additional electrically conductive antenna traces 33*a*"-33*b*". In this embodiment, since the pressure sensor 20" is rigid, the building material that surrounds the pressure sensor 20'" after placement will apply equalized pressure throughout the pressure sensor.

Figure 4:
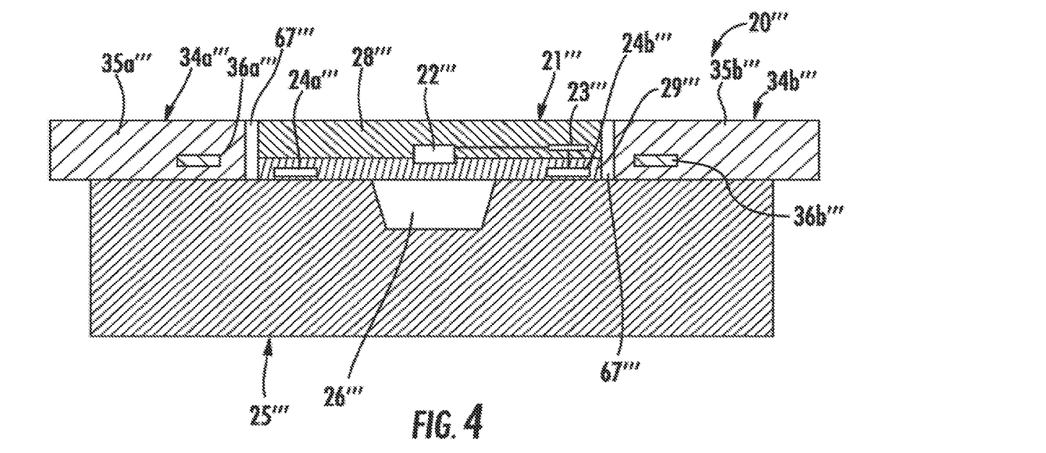
FIG. 4 is a schematic diagram of a cross-sectional view of another embodiment of the pressure sensor, according to the present disclosure.
Figure 5:
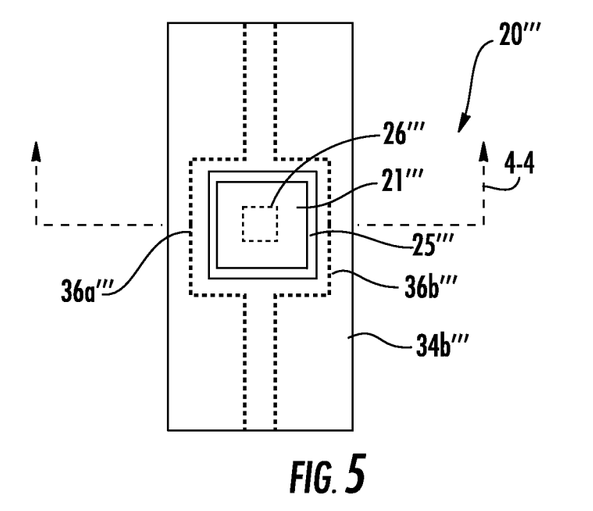
FIG. 5 is a schematic diagram of a top plan view of the pressure sensor of FIG. 4.

Referring now additionally to FIGS. 4-5, another embodiment of the pressure sensor 20'" is now described. In this embodiment of the pressure sensor 20'", those elements already discussed above with respect to FIG. 1 are given triple prime notation and most require no further discussion herein. This embodiment differs from the previous embodiment in that this pressure sensor 20'" illustratively includes a substrate 34*a*'"-34*b*'" surrounding the pressure sensor IC 21'" and defining a gap 67'" therebetween. The substrate 34*a*'"-34*b*'" comprises a dielectric layer 35*a*'"-35*b*'", and additional electrically conductive antenna traces 36*a*'"-36*b*'" electromagnetically coupled to the electrically conductive antenna traces 24*a*'"-24*b*'" that are electrically coupled to the transceiver circuit 23'".

The substrate 34*a*'"-34*b*'" may comprise a flexible substrate extending laterally outwardly from the pressure sensor IC 21'". In this embodiment, the additional electrically conductive antenna traces 36*a*'"-36*b*'" illustratively surround the pressure sensor IC 21'", and the substrate 34*a*'"-34*b*'" surrounds the pressure sensor IC. In this embodiment, when the substrate 34*a*'"-34*b*'" comprises a flexible material with a lower Young's modulus, the building material that surrounds the pressure sensor 20'" will apply concentrated pressure on the pressure sensor IC 21'", thereby increasing the variation of the piezoresistive or piezoelectric element therein.

Figure 6:
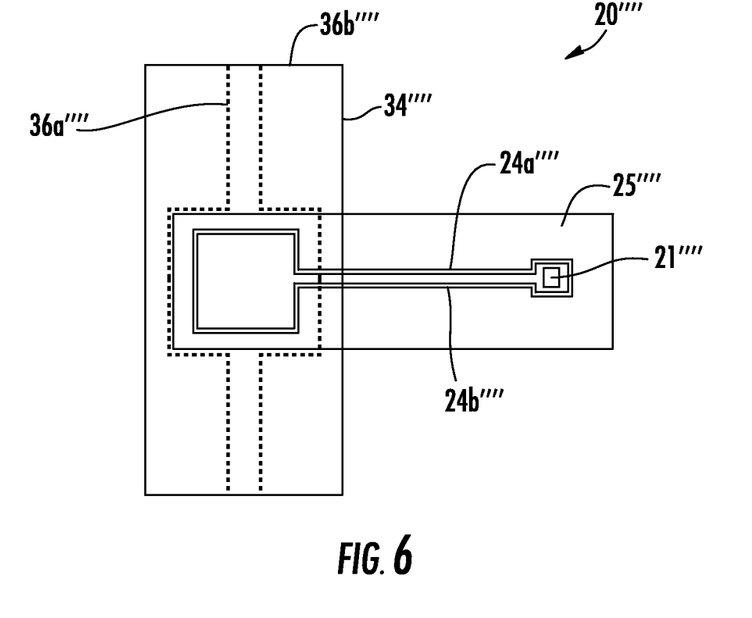
FIG. 6 is a schematic diagram of a top plan view of another embodiment of the pressure sensor of FIG. 4.

Referring now additionally to FIG. 6, another embodiment of the pressure sensor 20"" is now described. In this embodiment of the pressure sensor 20"", those elements already discussed above with respect to FIGS. 4-5 are given quadruple prime notation and most require no further discussion herein. This embodiment differs from the previous embodiment in that this pressure sensor 20"" illustratively includes the support body 25"" extending outwardly (substantially perpendicular to the substrate) and beyond the substrate 34"". The electrically conductive antenna traces 24*a*""-24*b*"" extend between ends of the support body 25"" and are arranged in opposing first and second loops (for example, square shaped in the illustrated embodiment). The first loop is within a similar loop defined by the additional electrically conductive antenna traces 36*a*""-36*b*"", and the second loop surrounds the pressure sensor IC 21"".

Figure 7:
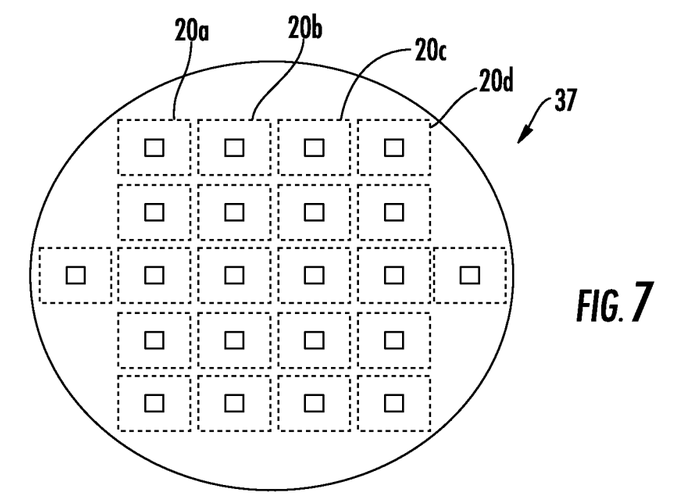
FIGS. 7 and 8 are schematic diagrams of top plan views of embodiments of the pressure sensors at a wafer level, according to the present disclosure.
Figure 8:
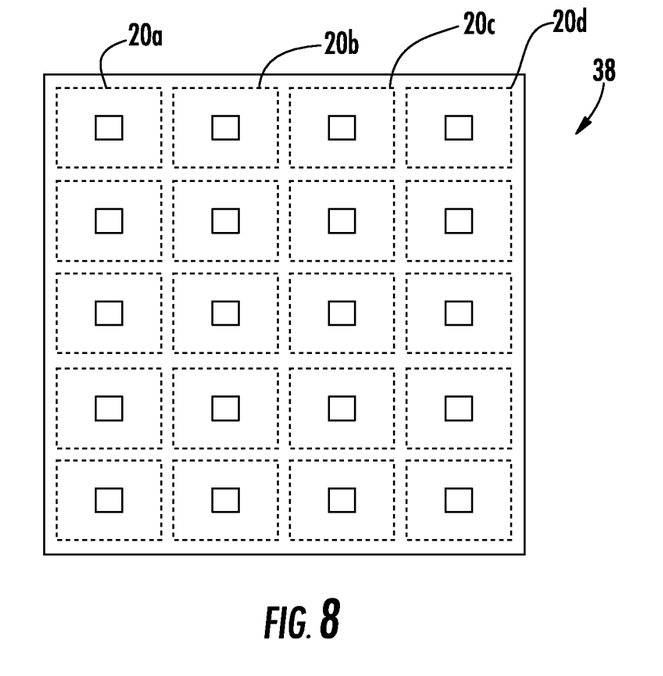

Referring now additionally to FIGS. 7 and 8, circle-shaped and square-shaped wafers 37, 38 comprising a plurality of pressure sensors 20*a*-20*d* are shown. Advantageously, the pressure sensors 20*a*-20*d* may be manufactured with wafer level processing techniques. Other wafer shapes are possible, such as a rectangle-shape or a polygon-shape.

Figure 9A:
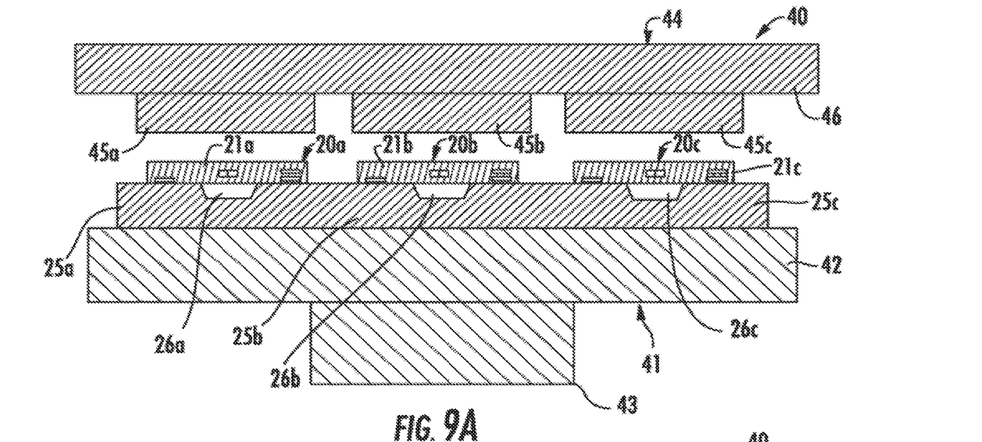
FIGS. 9A and 9B are schematic diagrams of cross-sectional views of a testing device for a pressure sensor, according to the present disclosure.
Figure 9B:
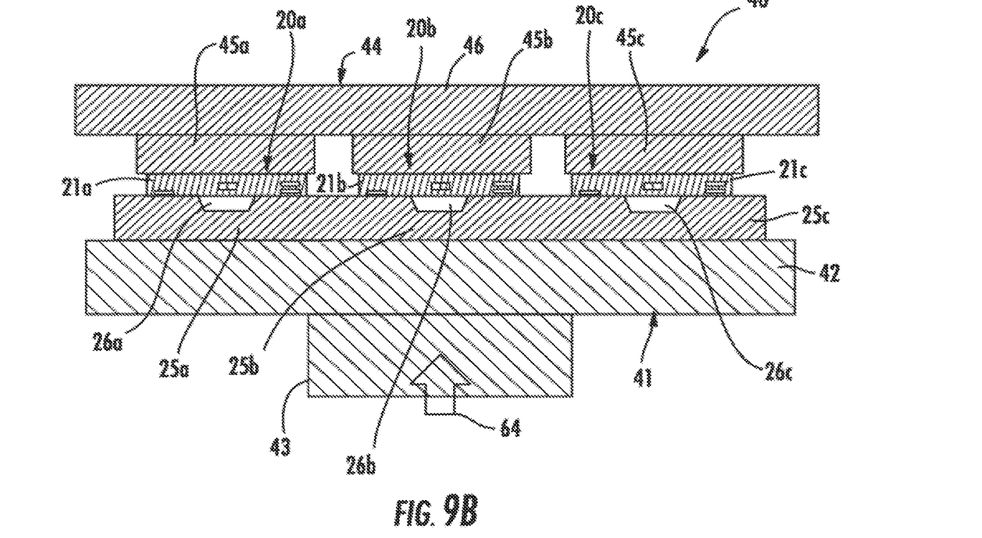

Referring now additionally to FIGS. 9A-9B, a testing device 40 according to the present disclosure is now described. The testing device 40 is for testing one or more pressure sensors 20*a*-20*c*, i.e. there is at least one pressure sensor under test. The pressure sensors 20*a*-20*c* under test in the illustrated embodiment are similar to the pressure sensor disclosed in FIG. 1, but it should be appreciated that other pressure sensors could be tested with the testing device 40.

The testing device 40 illustratively includes a probe chuck 41 configured to apply pressure to the support body 25*a*-25*c* of the pressure sensors 20*a*-20*c* under test, and a wireless card 44 configured to apply pressure to the pressure sensor IC 21*a*-21*c* of the pressure sensors under test, and generate RF energy to activate the pressure sensors under test. The wireless card 44 is coupled to Automatic Test Equipment (ATE) (not shown), and the probe chuck 41 may be part of prober equipment (not shown).

In this illustrated embodiment, the wireless card 44 illustratively includes a base 46, and a plurality of rigid presses 45*a*-45*c* for applying pressure respectively to the pressure sensor ICs 21*a*-21*c*. As perhaps best seen in FIG. 9B, the probe chuck 41 illustratively includes a base 43, and a rigid substrate 42 applying upward force 64 onto the support bodies 25*a*-25*c* of the pressure sensors 20*a*-20*c*. In some embodiments, the wireless card 44 may comprise a plurality of load cells between the base 46, and respectively the plurality of rigid presses 45a-45c. The load cells are for measuring the pressure exerted on the pressure sensor ICs 21a-21c of the pressure sensors 20a-20c under test. Although not shown, the rigid presses 45a-45c includes a plurality of electrically conductive antenna traces for activating the pressure sensors 20a-20c under test and exchanging information with them. Also, the rigid presses 45a-45c may comprise the same material used for the support body 25.

During testing, the wireless card 44 activates the pressure sensors 20a-20c under test with RF energy. The pressure sensors 20a-20c under test transmit a detected pressure value, and the testing device 40 compares the received value with the known pressure exerted by the probe chuck 41. Moreover, the probe chuck 41 has a regulated known temperature value and this can also be varied during testing.

Another aspect is directed to a method of operating a testing device 40 for at least one pressure sensor 20a-20c under test. The at least one pressure sensor under test 20a-20c may be positioned within a structure and comprising a pressure sensor IC 21a-21c comprising a pressure sensor circuit 22 responsive to bending, and a transceiver circuit 23 coupled to the pressure sensor circuit, and a support body 25a-25c having a recess 26a-26c therein coupled to the pressure sensor IC. The method may include using a probe chuck 41 of the testing device 40 to apply pressure to the support body 25a-25c of the at least one pressure sensor 20a-20c under test, and using a wireless card 44 of the testing device to apply pressure to the pressure sensor IC 21a-21c of the at least one pressure sensor under test, and generate RF energy to activate the at least one pressure sensor under test.

Figure 10:
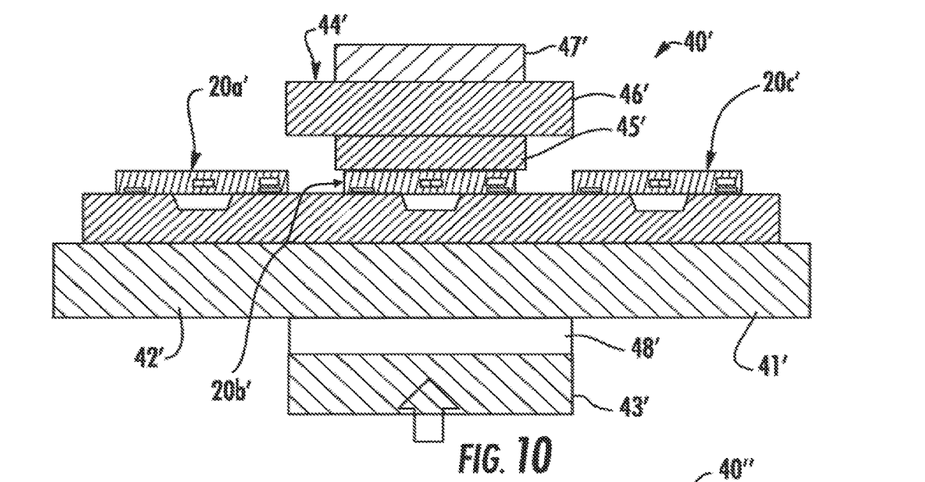
FIG. 10 is a schematic diagram of a cross-sectional view of another embodiment of the testing device, according to the present disclosure.

Referring now additionally to FIG. 10, another embodiment of the testing device 40' is now described. In this embodiment of the testing device 40', those elements already discussed above with respect to FIGS. 9A-9B are given prime notation and most require no further discussion herein. This embodiment differs from the previous embodiment in that this testing device 40' has the probe chuck 41' illustratively includes a load cell 48' between the base 43' and the rigid substrate 42'.

Also, the testing device 40' illustratively includes a joint 47' coupled to the wireless card 44' and configured to position the wireless card adjacent a respective pressure sensor under test 20a'-20c'. In some embodiments, the joint 47' may comprise a ball joint to ensure the rigid press 45' and the pressure sensor IC 21a'-21c' have parallel surfaces, thereby avoiding systematic measurement errors.

Figure 11:
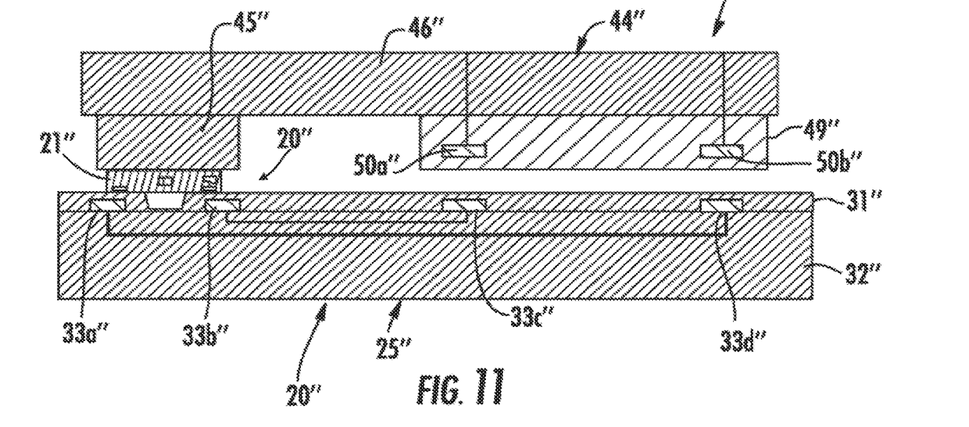
FIG. 11 is a schematic diagram of a cross-sectional view of another embodiment of the testing device, according to the present disclosure.

Referring now additionally to FIG. 11, another embodiment of the testing device 40" is now described. In this embodiment of the testing device 40", those elements already discussed above with respect to FIGS. 9A-9B are given double prime notation and most require no further discussion herein. This embodiment differs from the previous embodiment in that this testing device 40" is testing a pressure sensor 20" that is a variant of the pressure sensor 20" of FIG. 3. This pressure sensor 20" illustratively includes a support body 25" that is elongate and extends laterally away from the pressure sensor IC 21" and comprises additional electrically conductive antenna traces 33a"-33d" extending therethrough.

In this embodiment, the wireless card 44" illustratively includes a rigid press 45" configured to apply the pressure to the pressure sensor IC 21" of the pressure sensor 20" under test, electrically conductive antenna traces 50a"-50b" configured to generate the RF energy to activate the pressure sensor under test, and a substrate 49" coupled to the rigid press and carrying the electrically conductive antenna traces. The rigid press 45" and the substrate 49" are laterally spaced apart so as to accurately apply pressure and RF energy to activate electrically conductive antenna traces throughout the pressure sensor 20".

Figure 12:
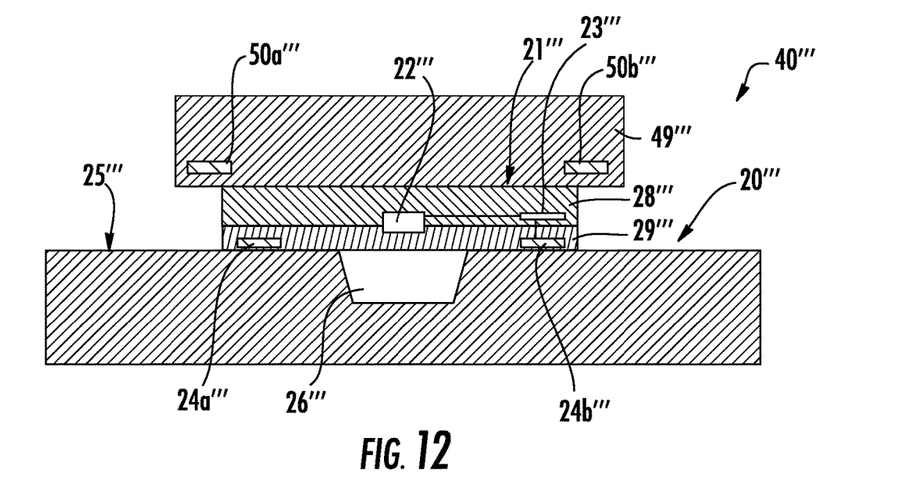
FIG. 12 is a schematic diagram of a cross-sectional view of another embodiment of the testing device, according to the present disclosure.

Referring now additionally to FIG. 12, another embodiment of the testing device 40''' is now described. In this embodiment of the testing device 40''', those elements already discussed above with respect to FIGS. 9A-9B are given triple prime notation and most require no further discussion herein. This embodiment differs from the previous embodiment in that this testing device 40''' combines the substrate and rigid press in a combined structure 49''', i.e. the rigid press and the substrate are integral. In this embodiment, the substrate 49''' may be formed from a multilayer structure of ceramic material. Advantageously, the substrate 49''' can support electrically conductive vias to couple the electrically conductive antenna traces 50a'''-50b''' yet provide a firm/strong (Young's modulus is sufficient) enough structure to apply appropriate pressure. Also, the substrate 49''' can apply pressure to the pressure sensor IC 21''' on the opposite side of the circuitry, thereby reducing the chances of damaging it.

Figure 13:
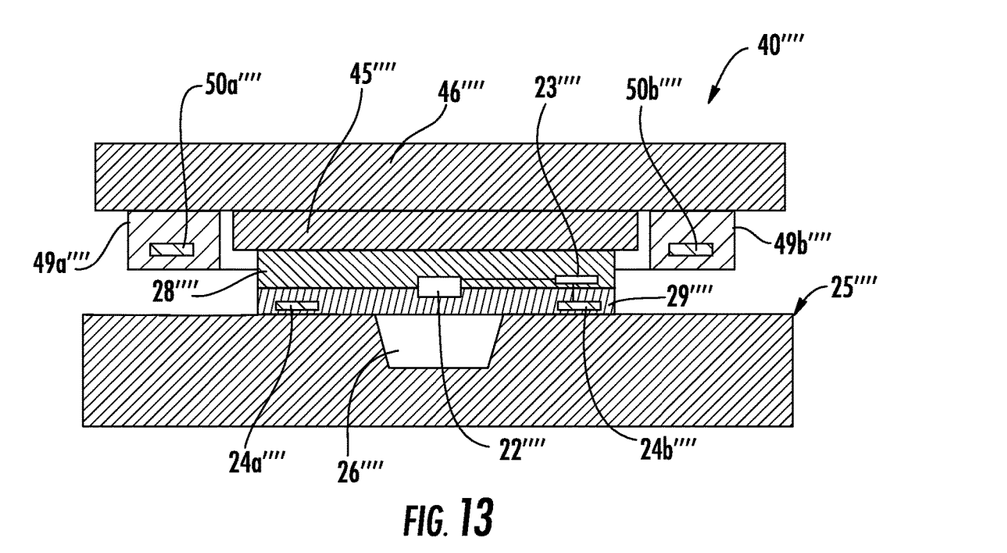
FIG. 13 is a schematic diagram of a cross-sectional view of another embodiment of the testing device, according to the present disclosure.

Referring now additionally to FIG. 13, another embodiment of the testing device 40'''' is now described. In this embodiment of the testing device 40'''', those elements already discussed above with respect to FIGS. 9A-9B are given quadruple prime notation and most require no further discussion herein. This embodiment differs from the previous embodiment in that this testing device 40'''' illustratively includes a substrate 49a''''-49b'''' surrounding the rigid press 45''''.

Figure 14:
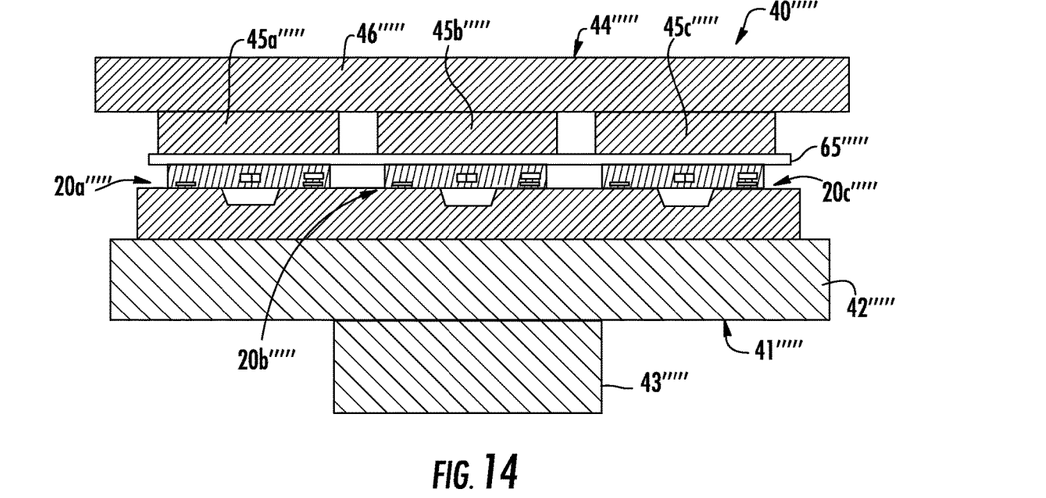
FIG. 14 is a schematic diagram of a cross-sectional view of another embodiment of the testing device, according to the present disclosure.
Figure 16:
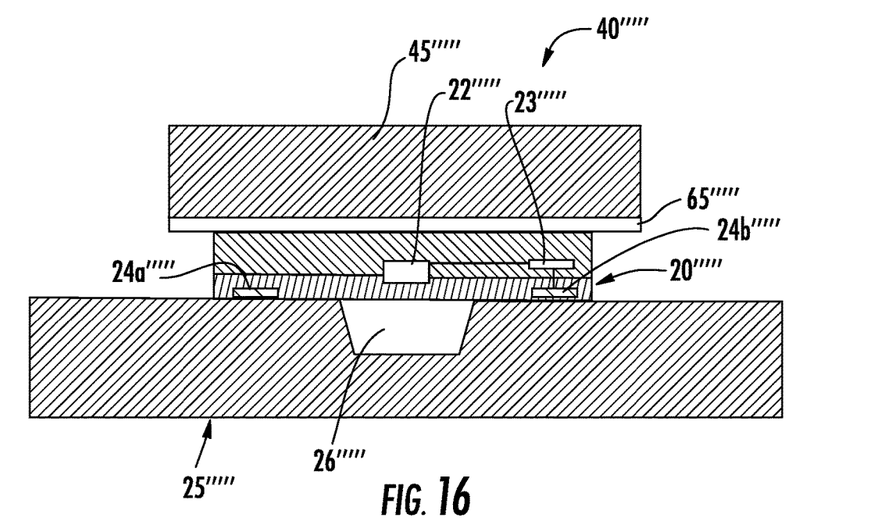
FIG. 16 is a schematic diagram of another cross-sectional view of the testing device of FIG. 14.

Referring now additionally to FIGS. 14 and 16, another embodiment of the testing device 40''''' is now described. In this embodiment of the testing device 40''''', those elements already discussed above with respect to FIGS. 9A-9B are given quintuple prime notation and most require no further discussion herein. This embodiment differs from the previous embodiment in that this testing device 40''''' illustratively includes a deformable layer 65''''' between the wireless card 44''''' and the pressure sensors 20a'''''-20c''''' under test. The deformable layer 65''''' may comprise one or more of Kapton, Teflon, a foil layer, or a paper layer and may insure equal and event contact.

Figure 15:
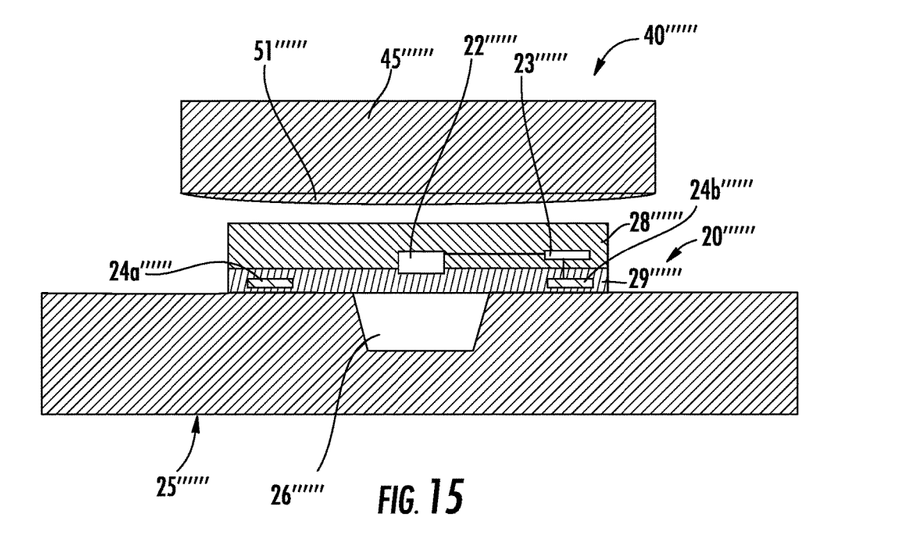
FIG. 15 is a schematic diagram of a cross-sectional view of yet another embodiment of the testing device, according to the present disclosure.

Referring now additionally to FIG. 15, another embodiment of the testing device 40'''''' is now described. In this embodiment of the testing device 40'''''', those elements already discussed above with respect to FIGS. 9A-9B are given sextuple prime notation and most require no further discussion herein. This embodiment differs from the previous embodiment in that this testing device 40'''''' illustratively includes a curved surface 51''''''. The curved surface 51'''''' applies a stress that is in correspondence to the shape of the recess 26''''''. The curved surface 51'''''' may comprise the same material used for the rigid press 45'''''' or a material having a Young's modulus less than the material used for the rigid press 45''''''.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A pressure sensor for positioning within a structure, the pressure sensor comprising:
    a pressure sensor integrated circuit (IC) comprising a pressure sensor circuit responsive to bending, and a transceiver circuit coupled to the pressure sensor circuit; and
    a support body having a recess therein coupled to the pressure sensor IC so that the pressure sensor IC is configured to bend into the recess when the pressure sensor IC is subjected to external pressure.

2. The pressure sensor of claim 1, wherein the pressure sensor IC includes electrically conductive antenna traces coupled to the transceiver circuit for receiving radio frequency (RF) energy.

3. The pressure sensor of claim 1, wherein the recess is trapezoidal in shape.

4. The pressure sensor of claim 1 further comprising a glass frit bonding layer between the pressure sensor IC and the support body.

5. The pressure sensor of claim 1, wherein the support body comprises a first layer defining the recess and comprising additional electrically conductive antenna traces coupled to the transceiver circuit, and a second layer adjacent the first layer.

6. The pressure sensor of claim 1, further comprising at least one substrate adjacent the pressure sensor IC and comprising additional electrically conductive antenna traces coupled to the transceiver circuit.

7. The pressure sensor of claim 6, wherein the at least one substrate comprises a flexible substrate extending laterally outwardly from the pressure sensor IC.

8. The pressure sensor of claim 6, wherein the additional electrically conductive antenna traces surround the pressure sensor IC.

9. The pressure sensor of claim 6, wherein the support body extends outwardly and substantially perpendicular to the at least one substrate.

10. The pressure sensor of claim 9, wherein
    the pressure sensor IC comprises electrically conductive antenna traces coupled to the transceiver circuit; and
    the electrically conductive antenna traces extend between ends of the support body.

11. The pressure sensor of claim 10, wherein a first antenna of the electrically conductive antenna traces and a second antenna of the electrically conductive antenna traces are arranged in opposing first and second loops.

12. The pressure sensor of claim 11, wherein the first loop is square-shaped and the second loop is square-shaped.

13. The pressure sensor of claim 1, wherein the support body comprises at least one of a ceramic material, a glass material, or a silicon material.

14. The pressure sensor of claim 1, wherein the pressure sensor circuit comprises piezoresistive pressure sensor circuitry or piezoelectric pressure sensor circuitry.

15. The pressure sensor of claim 1, wherein the pressure sensor IC has a thickness of 100 microns.

16. The pressure sensor of claim 1, wherein the pressure sensor is disposed in a wafer.

17. The pressure sensor of claim 16, wherein the wafer comprises a plurality of pressure sensors.

18. The pressure sensor of claim 1, wherein the pressure sensor IC is configured to measure pressures of 500 atmospheres or more.

19. A method for making a pressure sensor for positioning within a structure, the method comprising:
    providing a pressure sensor integrated circuit (IC) comprising a pressure sensor circuit responsive to bending, and a transceiver circuit coupled to the pressure sensor circuit; and
    forming a support body to have a recess therein coupled to the pressure sensor IC so that the pressure sensor IC bends into the recess when the pressure sensor IC is subjected to external pressure.

20. The method of claim 19, wherein the providing the pressure sensor IC further comprises providing the pressure sensor IC further comprising electrically conductive antenna traces coupled to the transceiver circuit for receiving radio frequency (RF) energy.

21. The method of claim 19, further comprising forming the recess to be trapezoidal in shape.

22. The method of claim 19, further comprising forming a glass frit bonding layer between the pressure sensor IC and the support body.

23. The method of claim 19, wherein the support body comprises a first layer defining the recess and comprising additional electrically conductive antenna traces coupled to the transceiver circuit, and a second layer adjacent the first layer.

24. The method of claim 19, further comprising forming at least one substrate adjacent the pressure sensor IC and comprising additional electrically conductive antenna traces coupled to the transceiver circuit.

25. A pressure sensor comprising:
    a pressure sensor integrated circuit (IC) comprising a transceiver circuit, a pressure sensor circuit coupled to the transceiver circuit, and a dielectric layer comprising an antenna trace coupled to the transceiver circuit;
    a support body having a recess, wherein the pressure sensor IC is configured to bend into the recess; and
    a glass frit bonding layer between the pressure sensor IC and the support body.

26. The pressure sensor of claim 25, wherein the pressure sensor circuit comprises piezoresistive pressure sensor circuitry.

27. The pressure sensor of claim 25, wherein the pressure sensor circuit comprises piezoelectric pressure sensor circuitry.

28. The pressure sensor of claim 25, wherein the pressure sensor IC has a thickness of 100 microns.

* * * * *